(12) United States Patent
Kim et al.

(10) Patent No.: US 6,801,568 B2
(45) Date of Patent: Oct. 5, 2004

(54) DESPREADING APPARATUS AND METHOD FOR CDMA SIGNAL

(75) Inventors: Sung-jin Kim, Suwon (KR); Kang-min Lee, Seongnam (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 809 days.

(21) Appl. No.: 09/758,039

(22) Filed: Jan. 11, 2001

(65) Prior Publication Data

US 2001/0030992 A1 Oct. 18, 2001

(30) Foreign Application Priority Data

Jan. 11, 2000 (KR) .......................................... 2000-1191

(51) Int. Cl.[7] .................................................. H04B 1/69
(52) U.S. Cl. ...................................................... 375/150
(58) Field of Search ................................ 375/130, 147, 375/148–150, 142, 145; 370/335, 342, 441

(56) References Cited

U.S. PATENT DOCUMENTS

| | | | |
|---|---|---|---|
| 5,691,974 A | 11/1997 | Zehavi et al. | |
| 5,712,869 A | 1/1998 | Lee et al. | |
| 5,768,306 A | 6/1998 | Sawahashi et al. | ......... 375/206 |
| 5,910,950 A * | 6/1999 | ten Brink | .................... 370/342 |
| 6,009,089 A * | 12/1999 | Huang et al. | ................ 370/342 |
| 6,154,487 A * | 11/2000 | Murai et al. | ................. 375/150 |
| 6,359,875 B1 | 3/2002 | Hamada et al. | |
| 6,680,727 B2 * | 1/2004 | Butler et al. | ................. 375/144 |
| 6,700,880 B2 * | 3/2004 | Ling | .......................... 370/334 |

FOREIGN PATENT DOCUMENTS

| | | |
|---|---|---|
| EP | 0 854 586 A2 | 7/1998 |
| JP | 11-127089 | 5/1999 |

* cited by examiner

*Primary Examiner*—Tesfaldet Bocure
(74) *Attorney, Agent, or Firm*—Lee & Sterba, P.C.

(57) ABSTRACT

An apparatus and method for despreading a CDMA signal, wherein the apparatus performs a predetermined operation on a received CDMA signal and first and second codes to extract a pilot symbol and a data symbol from the received CDMA signal when the first and second codes are generated internally; and includes a correlation unit for performing operations on the respective inphase and quadrature components of the first code and accumulatively storing the results of the operations depending on first and second selection signals obtained from the first and second codes, a decimator for outputting individual accumulated values after individual results of the operation are separately accumulated a predetermined number of times by the correlation unit, and a symbol output unit for performing a predetermined operation on individual values output from the decimator to output the pilot symbol and the data symbol.

16 Claims, 3 Drawing Sheets

DESPREADING APPARATUS AND METHOD FOR CDMA SIGNAL

BACKGROUND OF THE INVENTION

1. Field of the Invention

The present invention relates to a despreading apparatus and method for a code division multiple access (CDMA) signal.

2. Description of the Related Art

CDMA systems are largely classified into a direct sequence (DS) system and a frequency hopping (FH) system. While the FH system has not been widely used, the DS/CDMA system has been adopted as a standard and is widely used in a mobile communication environment. Although a frequency division multiple access system and a time division multiple access system are also used as standards in mobile communication, the DS/CDMA system has been adopted as a standard recommendation for International Mobile Telecommunication (IMT)-2000 since the DS/CDMA system can increase the number of users that can be served more easily than the other systems.

In a CDMA system, user data is spread using a spreading code sequence and transmitted. By doing this, user data can be transmitted with a large bandwidth so that it can be robust against a multi-interference signal and multipath fading. To receive the spread signal, the same spreading code sequence used for transmission should be used for receiving. Receiving a spread signal includes the steps of searching a spreading code sequence and detecting the signal. Both steps include a procedure of despreading a signal. Despreading a signal is converting down a large bandwidth of the signal to an original small bandwidth of the signal before transmission. Accordingly, high speed signal processing is required.

A CDMA system recommended by an IS-95 standard recommendation converts a signal of 1.2288 MHz down to a signal of 9.6 KHz. Thus, the system should process data having a bandwidth 128 times wider than an original bandwidth of data before being despread. Generally, large bandwidth data requires a faster signal processing ability than small bandwidth data. To realize a software radio CDMA receiver, it is necessary to reduce the amount of calculations for despreading, which cause a bottleneck in signal processing.

Conventionally, a method of fast initial synchronization using a memory is used for fast signal processing. For example, this method is disclosed in U.S. Pat. No. 5,768,306. The memory is designed such that a received signal is stored in the memory at frequency of $1/T_c$ ($T_c$ is a chip period) and is read from the memory at high frequency of $K/T_c$. Although data is received at a rate of $1/T_c$, the data stored in the memory is read at a higher rate of $K/T_c$ and processed so that signal processing related to a search can be performed on many signals simultaneously. Although this method is provided for searching many phase signals simultaneously in a searching apparatus operated by a fast clock, it does not reduce the amount of calculations.

Accordingly, it is desirable to reduce the amount of calculations during a real-time signal detection. If the signal detection is realized as hardware, a high clock speed is required, which generates significant heat. Generation of much heat results in large power consumption of the hardware so that using the hardware is not suitable to a mobile receiver using a CDMA signal. Accordingly, reducing the amount of calculations for the signal detection is desirable, and particularly, reducing the amount of calculations for despreading a received CDMA signal is desirable.

SUMMARY OF THE INVENTION

To solve the above problems, it is a feature of an embodiment of the present invention to provide a despreading apparatus and a method for obtaining a pilot symbol and a data symbol from a received code division multiple access (CDMA) signal using a value obtained by performing a predetermined operation on inphase and quadrature pilot pseudo noise (PN) codes when the received CDMA signal is despread.

In an effort to satisfy this and other features of the present invention, in one aspect, there is provided an apparatus for despreading a CDMA signal. The apparatus performs a predetermined operation on a received CDMA signal and first and second codes to extract a pilot symbol and a data symbol from the received CDMA signal when the first and second codes are generated internally. The apparatus includes a correlation unit for performing operations on the respective inphase and quadrature components of the received signal and the respective inphase and quadrature components of the first code and accumulatively storing the results of the operations depending on first and second selection signals which are obtained from the first and second codes. The apparatus further includes a decimator for outputting individual accumulated values after individual results of the operation are separately accumulated a predetermined number of times by the correlation unit. The apparatus additionally includes a symbol output unit for performing a predetermined operation on individual values output from the decimator to output the pilot symbol and the data symbol.

In another aspect, there is provided a method of despreading a CDMA signal, in which a predetermined operation on a received signal and first and second codes is performed to extract a pilot symbol and a data symbol from the received CDMA signal when the first and second codes are generated internally in a CDMA signal receiver. The method includes (a) performing operations on the respective inphase and quadrature components of the received signal and the respective inphase and quadrature components of the first code; (b) accumulatively storing the results of the operation a predetermined number of times depending on first and second selection signals which are obtained from the first and second codes; and (c) performing a predetermined operation on individual accumulated values after individual results of the operation are separately accumulated and outputting the pilot symbol and the data symbol.

There is also provided a method of despreading a CDMA signal, in which a predetermined operation on a received signal and first and second codes is performed to extract a pilot symbol and a data symbol from the received CDMA signal when the first and second codes are generated internally in a CDMA signal receiver. The method includes (a) grouping data of one symbol depending on the combination of the first code and the second code; (b) performing predetermined operations on the inphase component of the received signal and the inphase component of the first code with respect to the data of each group and accumulating the results of the operation during a symbol duration, and simultaneously, performing predetermined operations on the quadrature component of the received signal and the quadrature component of the first code with respect to the data of each group and accumulating the results of the operation during the symbol duration; (c) combining the accumulated results of inphase components of one group with the accumulated results of quadrature components of the other group, the groups having the same second code, thereby obtaining a plurality of partial sums; and (d) performing a predetermined operation on the partial sums to obtain the pilot symbol and the data symbol.

These and other features of the present invention will be readily apparent to those of ordinary skill in the art upon review of the detailed description that follows.

BRIEF DESCRIPTION OF THE DRAWINGS

The above feature and advantages of the present invention will become more apparent by describing in detail preferred embodiments thereof with reference to the attached drawings in which.

DETAILED DESCRIPTION OF PREFERRED EMBODIMENTS

Korean patent application No. 00-1191, filed on Jan. 11, 2000, and entitled: "Despreading Apparatus and Method for CDMA Signal," is incorporated by reference herein in its entirety.

Figure 1:
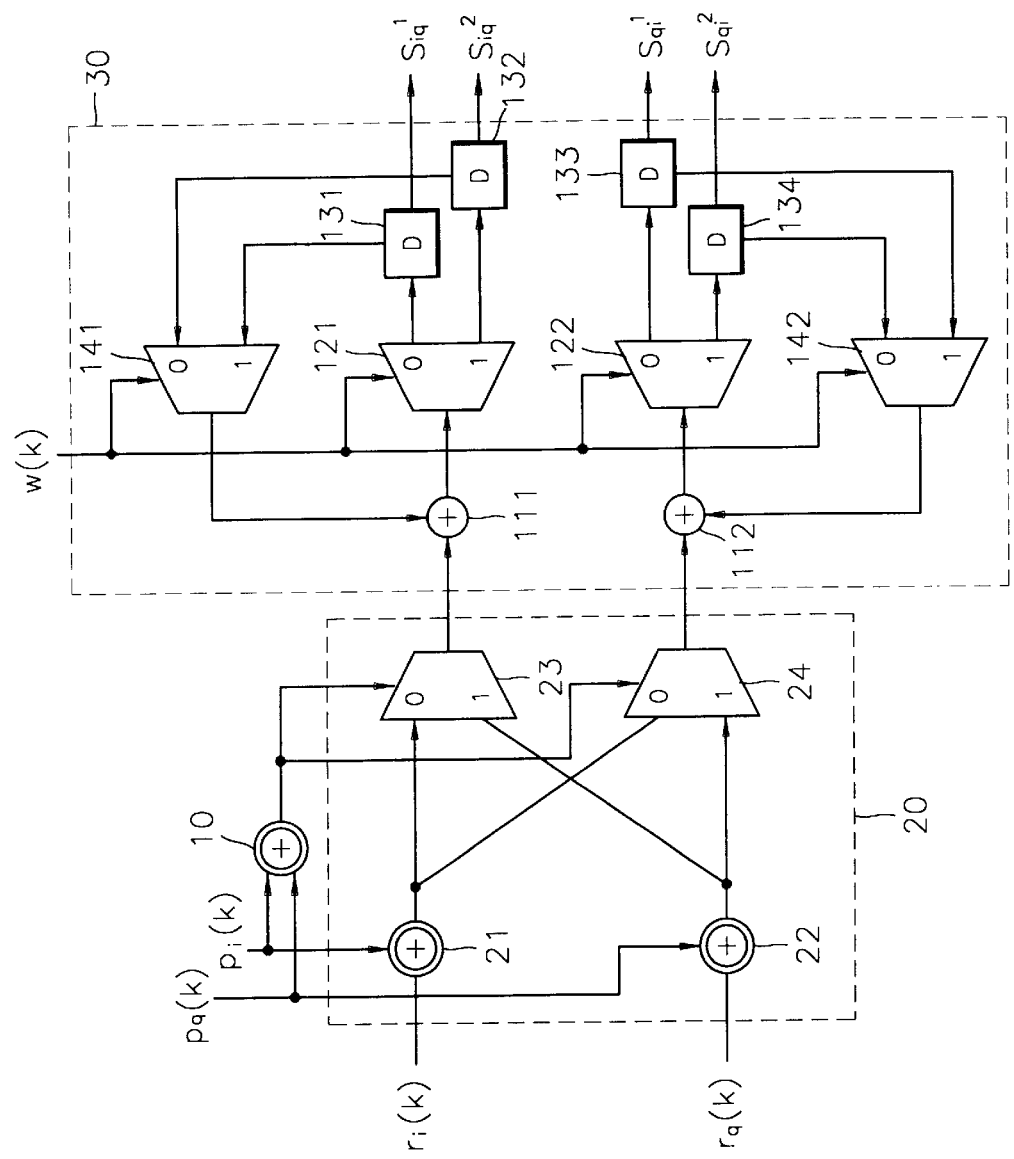
FIG. 1 is a block diagram that illustrates a pseudo noise (PN) and Walsh correlator for a code division multiple access (CDMA) signal according to the present invention.

Hereinafter, embodiments of the present invention will be described in detail with reference to the attached drawings. Referring to FIG. 1, a pseudo noise (PN) and Walsh correlator for a code division multiple access (CDMA) signal according to the present invention includes a selection signal generator 10, a PN correlator 20 and an accumulation unit 30.

The selection signal generator 10 outputs the result of exclusively ORing the inphase component and the quadrature component of a pilot PN code generated by a pilot PN code generator (not shown).

The PN correlator 20 includes: a first exclusive ORing unit 21 for exclusively ORing the inphase component of a received signal and the inphase component of a pilot PN code, a second exclusive ORing unit 22 for exclusively ORing the quadrature phase component of the received signal and the quadrature component of the pilot PN code and first and second multiplexers 23 and 24 each for outputting one of the outputs of the first and second exclusive ORing units 21 and 22 in response to a selection signal generated by the selection signal generator 10.

The accumulation unit 30 includes a first accumulator 111 for accumulating the output of the first multiplexer 23; a second accumulator 112 for accumulating the outputs of the second multiplexer 24; first and second demultiplexers 121 and 122 for outputting the outputs of the first and second accumulators 111 and 112, respectively, to one of a plurality of output terminals, respectively, according to Walsh code w(k) generated for a received signal channel; latch units 131, 132 133 and 134 which are connected to the output terminals, respectively, of the first and second demultiplexers 121 and 122 and store the outputs of the first and second demultiplexers 121 and 122; a third multiplexer 141 for selecting one of the outputs of the latch units 131 and 132 according to the Walsh code and outputting it to the first accumulator 111 as a previous output; and a fourth multiplexer 142 for selecting one of the outputs of the latch units 133 and 134 according to the Walsh code and outputting it to the second accumulator 112 as a previous output.

A procedure of despreading a CDMA signal using the structure described above will be described. Despreading a CDMA signal is extracting a pilot symbol x and a data symbol y from a received signal $r(k)=r_i(k)+jr_q(k)$ using PN despreading and Walsh orthogonal covering. Here, $r_i(k)$ is the inphase component of $r(k)$ and $r_q(k)$ is the quadrature component of $r(k)$. A data symbol is used for data demodulation, and a pilot symbol is used for frequency error estimation, finger lock detection and a channel estimation. The pilot symbol x can be expressed by Equation (1) when $p_i(k)$ is the inphase component of a pilot PN code, and $P_q(k)$ is the quadrature component of a pilot PN code.

$$x = x_i + jx_q \qquad (1)$$

$$= \sum_{k=1}^{64} (r_i(k) + jr_q(k))(p_i(k) - jp_q(k))$$

$$= \sum_{k=1}^{64} \{(r_i(k)p_i(k) + r_q(k)p_q(k) + j(-r_i(k)p_q(k) +$$

$$r_q(k)p_i(k))\}$$

$$= \sum_{k=1}^{64} \{u(k) + jv(k)\}$$

where $x_i$ is the inphase component of the pilot symbol x, and $X_q$ is the quadrature component of the pilot symbol x. The data symbol y can be expressed by Equation (2) when w(k) is a Walsh code.

$$y = y_i + iy_q \qquad (2)$$

$$= \sum_{k=1}^{64} w(k)(r_i(k) + jr_q(k))(p_i(k) - jp_q(k))$$

$$= \sum_{k=1}^{64} \{w(k)u(k) + jw(k)v(k)\}$$

where $y_i$ is the inphase component of the data symbol y, and $y_q$ is the quadrature component of the pilot symbol y. From Equation (1) and Equation (2), u(k) and v(k) can be expressed as follows.

$$u(k)=r_i(k)p_i(k)+r_q(k)p_q(k)$$

$$v(k)=-r_i(k)p_q(k)+r_q(k)p_i(k) \qquad (3)$$

Figure 2:
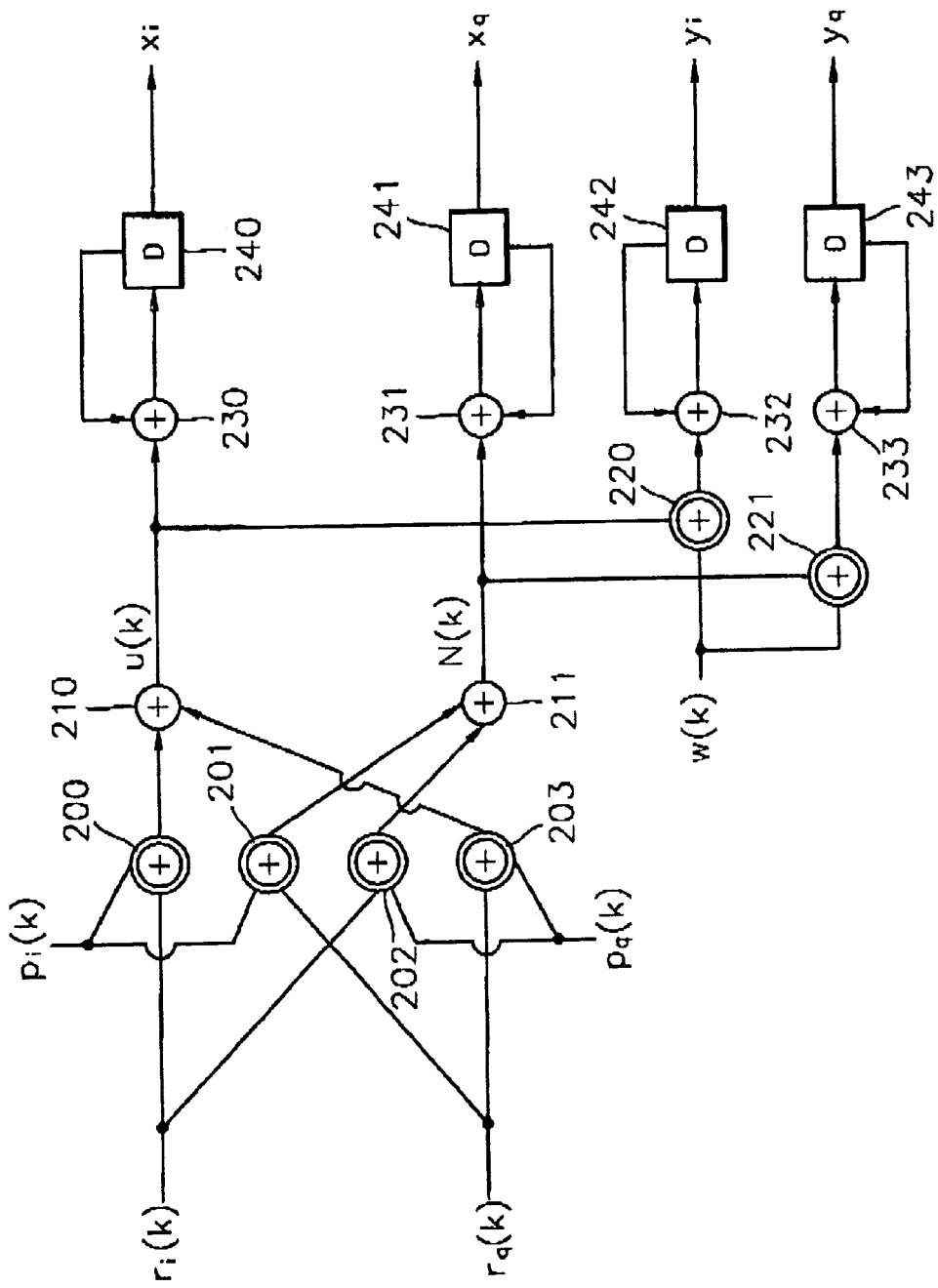
FIG. 2 is a block diagram that illustrates a PN and Walsh correlator.

For calculation of Equations (1), (2) and (3), 6×64 additions should be performed. FIG. 2 is a block diagram that illustrates a PN and Walsh correlator for performing Equations (1) through (3). The PN and Walsh correlator of FIG. 2 includes first through fourth exclusive ORing units 200, 201, 202 and 203 for exclusively ORing the inphase and quadrature components of a received signal and the inphase and quadrature components of a pilot PN code; first and second adders 210 and 211 for selectively adding the outputs of the first through fourth exclusive ORing units 200, 201, 202 and 203 to output the result of Equation (3); a first accumulator 230 or accumulating the output of the first adder 210; a second accumulator 231 for accumulating the output of the second adder 211; first and second latch units 240 and 241 for storing the outputs, respectively, of the first and second accumulators 230 and 231 and outputting the stored values to the first and second accumulators 230 and 231, respectively; fifth and sixth exclusive ORing units 220 and 221 for exclusively ORing the respective outputs of the first and second adders 210 and 211 and a Walsh code; a third accumulator 232 for accumulating the output of the fifth exclusive ORing unit 220; a fourth accumulator 233 for accumulating the output of the sixth exclusive ORing unit 221; and third and fourth latch units 242 and 243 for storing the outputs, respectively, of the third and fourth accumulators 232 and 233 and outputting the stored values to the third and fourth accumulators 232 and 233, respectively.

The PN and Walsh correlator of FIG. 2 uses 6 adders and 4 latch units. The 4 latch units are used at every chip. For one symbol period composed of 64 chips, 6×64 additions are performed. If the number of adders is reduced by ⅓, the number of latch units increases to $2^3$ times. Accordingly, additional reductions in the amount of calculations are desired.

To reduce the amount of calculations, the present invention divides one symbol data into a predetermined number of groups according to the combination of a pilot code and a Walsh code, extracts a pilot symbol and a data symbol from each group, and combines the extracted values.

Data of one symbol can be grouped as showed in Equation (4).

$$K_1 = \{k | p_i(k) \cdot p_q(k) = 1, w(k) = 1, k = 1, 2, \ldots, 64\}$$
$$K_2 = \{k | p_i(k) \cdot p_q(k) = 1, w(k) = -1, k = 1, 2, \ldots, 64\}$$
$$K_3 = \{k | p_i(k) \cdot p_q(k) = -1, w(k) = 1, k = 1, 2, \ldots, 64\}$$
$$K_4 = \{k | p_i(k) \cdot p_q(k) = -1, w(k) = -1, k = 1, 2, \ldots, 64\} \quad (4)$$

The pilot symbol x and data symbol y of each group can be expressed by Equation (5).

$$x = \sum_{k \in K_1} \{u(k) + jv(k)\} + \sum_{k \in K_2} \{u(k) + jv(k)\} + \sum_{k \in K_3} \{u(k) + jv(k)\} + \sum_{k \in K_4} \{u(k) + jv(k)\} \quad (5)$$

$$y = \sum_{k \in K_1} \{w(k)u(k) + jw(k)v(k)\} + \sum_{k \in K_2} \{w(k)u(k) + jw(k)v(k)\} + \sum_{k \in K_3} \{w(k)u(k) + jw(k)v(k)\} + \sum_{k \in K_4} \{w(k)u(k) + jw(k)v(k)\}$$

For data k, $k \in K_1$, if the inphase component and the quadrature component of a partially accumulated value are represented by $S_i^1$ and $S_q^1$, respectively, they can be expressed by Equation (6).

$$S_i^1 = \sum_{k \in K_1} r_i(k) p_i(k) = \sum_{k \in K_1} r_i(k) w(k) p_i(k) \quad (6)$$
$$= \sum_{k \in K_1} r_i(k) p_q(k) = \sum_{k \in K_1} r_i(k) w(k) p_q(k)$$

$$S_q^1 = \sum_{k \in K_1} r_q(k) p_q(k) = \sum_{k \in K_1} r_q(k) w(k) p_q(k)$$
$$= \sum_{k \in K_1} r_q(k) p_i(k) = \sum_{k \in K_1} r_q(k) w(k) p_i(k)$$

For data k, $k \in K_2$, if the inphase component and the quadrature component of a partially accumulated value are represented by $S_i^2$ and $S_q^2$, respectively, they can be expressed by Equation (7).

$$S_i^2 = \sum_{k \in K_2} r_i(k) p_i(k) = -\sum_{k \in K_2} r_i(k) w(k) p_i(k) \quad (7)$$
$$= \sum_{k \in K_2} r_i(k) p_q(k) = -\sum_{k \in K_1} r_i(k) w(k) p_q(k)$$

$$S_q^2 = \sum_{k \in K_2} r_q(k) p_q(k) = -\sum_{k \in K_2} r_q(k) w(k) p_q(k)$$
$$= \sum_{k \in K_2} r_q(k) p_i(k) = -\sum_{k \in K_2} r_q(k) w(k) p_i(k)$$

For data k, $k \in K_3$, if the inphase component and the quadrature component of a partially accumulated value are represented by $S_i^3$ and $S_q^3$, respectively, they can be expressed by Equation (8).

$$S_i^3 = \sum_{k \in K_3} r_i(k) p_i(k) = \sum_{k \in K_3} r_i(k) w(k) p_i(k) \quad (8)$$
$$= -\sum_{k \in K_3} r_i(k) p_q(k) = -\sum_{k \in K_3} r_i(k) w(k) p_q(k)$$

$$S_q^3 = \sum_{k \in K_3} r_q(k) p_q(k) = \sum_{k \in K_3} r_q(k) w(k) p_q(k)$$
$$= -\sum_{k \in K_3} r_q(k) p_i(k) = -\sum_{k \in K_1} r_q(k) w(k) p_i(k)$$

For data k, $k \in K_4$, if the inphase component and the quadrature component of a partially accumulated value are represented by $S_i^4$ and $S_q^4$, respectively, they can be expressed by Equation (9).

$$S_i^4 = \sum_{k \in K_4} r_i(k) p_i(k) = -\sum_{k \in K_4} r_i(k) w(k) p_i(k) \quad (9)$$
$$= -\sum_{k \in K_4} r_i(k) p_q(k) = \sum_{k \in K_4} r_i(k) w(k) p_q(k)$$

$$S_q^4 = \sum_{k \in K_4} r_q(k) p_q(k) = -\sum_{k \in K_4} r_q(k) w(k) p_q(k)$$
$$= -\sum_{k \in K_4} r_q(k) p_i(k) = \sum_{k \in K_1} r_q(k) w(k) p_i(k)$$

Equations (5) through (9) can be arranged into a matrix as shown in Equation (10).

$$\begin{bmatrix} x_i \\ x_q \\ y_i \\ y_q \end{bmatrix} = \begin{bmatrix} 1 & 1 & 1 & 1 \\ -1 & -1 & 1 & 1 \\ 1 & -1 & 1 & -1 \\ -1 & 1 & 1 & -1 \end{bmatrix} \begin{bmatrix} S_{iq}^1 \\ S_{iq}^2 \\ S_{qi}^1 \\ S_{qi}^2 \end{bmatrix} \quad (10)$$

where $S_{iq}^1 = S_i^1 + S_q^3$, $S_{iq}^2 = S_i^2 + S_q^4$, $S_{qi}^1 = S_q^1 + S_i^3$ and $S_{qi}^2 = S_q^2 + S_i^4$. In other words, a pilot symbol and a data symbol can be obtained by performing fast Hadamard transform of the above matrix on $S_{iq}^1$, $S_{iq}^2$, $S_{qi}^1$ and $S_{qi}^2$. Accordingly, 2×6+8 additions are required.

When $S_{iq}^1$, $S_{iq}^2$, $S_{qi}^1$ and $S_{qi}^2$ at an arbitrary k are represented by $S_{iq}^1(k)$, $S_{iq}^1(k)$, $S_{qi}^1(k)$ and $S_{qi}^2(k)$, respectively, their values can be calculated as follows.

$$S_{iq}^1(k) = \begin{cases} S_{iq}^1(k-1) + r_i(k)p_i(k), k \in K_1 \\ S_{iq}^1(k-1) + r_q(k)p_q(k), k \in K_3 \end{cases} \quad (11)$$

-continued $$S_{iq}^2(k) = \begin{cases} S_{iq}^2(k-1) + r_i(k)p_i(k), k \in K_2 \\ S_{iq}^2(k-1) + r_q(k)p_q(k), k \in K_4 \end{cases}$$

$$S_{qi}^1(k) = \begin{cases} S_{qi}^1(k-1) + r_q(k)p_q(k), k \in K_1 \\ S_{qi}^1(k-1) + r_i(k)p_i(k), k \in K_3 \end{cases}$$

$$S_{qi}^2(k) = \begin{cases} S_{qi}^2(k-1) + r_q(k)p_q(k), k \in K_2 \\ S_{qi}^2(k-1) + r_i(k)p_i(k), k \in K_4 \end{cases}$$

When the data blocks of $k \in K_1$ and $k \in K_2$ are changed into the data blocks of $k \in K_3$ and $k \in K_4$, adders are changed. When the data blocks of $k \in K_1$ and $k \in K_3$ are changed into the data blocks of $k \in K_2$ and $k \in K_4$, latch units are changed.

The PN and Walsh correlator of FIG. 1 is provided for performing an operation according to Equation (11). The selection signal generator 10 exclusively ORs the inphase component $p_i(k)$ are the quadrature component $p_q(k)$ of a pilot PN sequence. The first exclusive ORing unit 21 of the PN correlator 20 exclusively ORs the inphase component $r_i(k)$ of a received signal and the inphase component $p_i(k)$ of a pilot PN code. The second exclusive ORing unit 22 exclusively ORs the quadrature component $r_q(k)$ of the received signal and the quadrature component $p_q(k)$ of the pilot PN code. Each of the first and second multiplexers 23 and 24 selects one of the outputs of the first and second exclusive ORing units 21 and 22 in response to the output of the signal generator 10.

The first and second accumulators 111 and 112 add the respective outputs of the first and second multiplexers 23 and 24 to respective previous outputs stored in the latch units 131 through 134. The accumulated value of the first accumulator 111 is stored in one of the latch units 131 and 132 through the first demultiplexer 121 having a Walsh code w(k) as a selection signal. The values stored in the latch units 131 through 134 are output to the first and second accumulators 111 and 112 through the third and fourth multiplexers 141 and 142, respectively, having the Walsh code as a selection signal.

Figure 3:
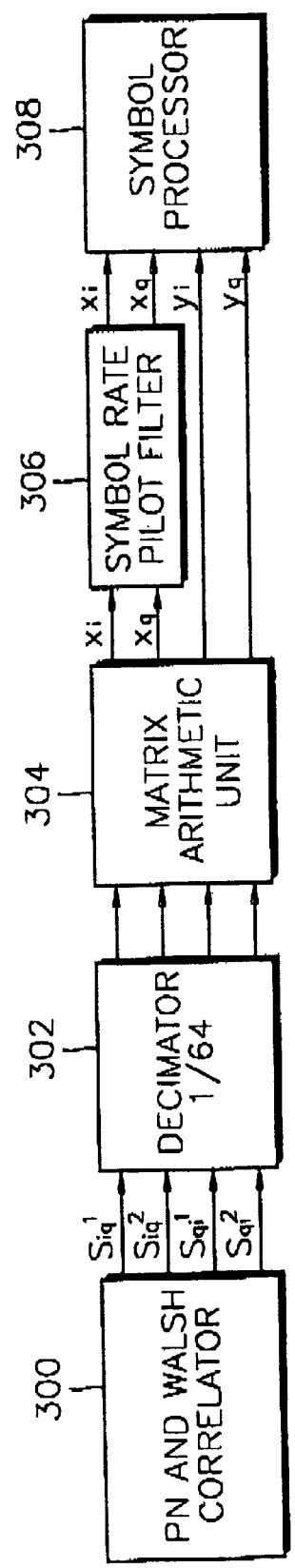
FIG. 3 is a block diagram that illustrates a finger of a rake receiver for a CDMA signal according to the present invention.

FIG. 3 is a block diagram that illustrates a finger of a rake receiver for a CDMA signal according to the present invention. The finger of FIG. 3 includes a PN and Walsh correlator 300, a data decimator 302, a matrix arithmetic unit 304, a symbol rate pilot filter 306 and a symbol processor 308.

In the operation of the finger having the above structure, a CDMA signal received through an antenna is processed such as RF to IF down-conversion and then is input to the PN and Walsh correlator 300. The PN and Walsh correlator 300 is the apparatus shown in FIG. 1, and it operates as described above. The decimator outputs $S_{iq}^1$, $S_{iq}^2$, $S_{qi}^1$ and $S_{qi}^2$ received from the PN and Walsh correlator 300 once each one symbol period.

The matrix arithmetic unit 304 performs a matrix operation described in Equation (10) on $S_{iq}^1$, $S_{iq2}$, $S_{qi}^1$ and $S_{qi}^2$ output from the decimator 302 each one symbol period to generate a data symbol and an on-time pilot symbol. The matrix operation is performed according to the fast Hadamard transform.

The symbol rate pilot filter 306 filters the pilot symbol output from the matrix arithmetic unit 304. Here, it is preferable to use a moving average filter as the symbol rate pilot filter 306. By using the filter, noise can be removed.

The symbol processor 308 performs typical frequency error compensation, channel compensation and data symbol processing for diversity combination on the pilot symbol output from the symbol rate pilot filter 306 and the data symbol output from the matrix arithmetic unit 304.

According to the present invention, when despreading a received signal, data of one symbol is grouped depending on the combination of a pilot PN code and a Walsh code, and the productions of the received signal and the pilot PN code are accumulated for each group, thereby reducing the number of additions from 6×64 to 2×64+8. In addition, the same number of latch units as used in conventional technology can be used even though the amount of calculations is reduced. Since a correlator can be driven at a lower clock speed as the amount of calculations is reduced, the amount of internally generated heat and power consumption can be reduced. Therefore, the present invention can be applied to a software radio mobile terminal susceptible to power consumption.

While the invention has been described in terms of preferred embodiments, those of ordinary skill in the art will recognize that various modifications may be made to the invention without departing from the spirit and scope thereof.

What is claimed is:

1. An apparatus for despreading a code division multiple access (CDMA) signal, the apparatus performing a predetermined operation on a received CDMA signal and first and second codes to extract a pilot symbol and a data symbol from the received CDMA signal when the first and second codes are generated internally, the apparatus comprising:

a correlation unit for performing operations on the respective inphase and quadrature components of the received signal and the respective inphase and quadrature components of the first code and accumulatively storing the results of the operations depending on first and second selection signals which are obtained from the first and second codes;

a decimator for outputting individual accumulated values after individual results of the operation are separately accumulated a predetermined number of times by the correlation unit; and a symbol output unit for performing a predetermined operation on individual values output from the decimator to output the pilot symbol and the data symbol.

2. The apparatus of claim 1, wherein the correlation unit comprises:

a first selection signal generator for performing a predetermined operation on the inphase and quadrature components of the first code to generate the first selection signal;

a correlator for performing a predetermined operation on the respective inphase and quadrature components of the received signal and the respective inphase and quadrature components of the first code and selectively outputting the results of the operation in response to the first selection signal; and an accumulator for selectively accumulating the output of the correlator depending on the second selection signal.

3. The apparatus of claim 2, wherein the first selection signal generator is an exclusive ORing unit for exclusively ORing the inphase and quadrature components of the first code.

4. The apparatus of claim 3, wherein the second selection signal is the second code.

5. The apparatus of claim 2, wherein the correlator comprises:

a first exclusive ORing unit for exclusively ORing the inphase component of the received signal and the inphase component of the first code;

a second exclusive ORing unit for exclusively ORing the quadrature component of the received signal and the quadrature component of the first code; and a first multiplexer and a second multiplexer each for receiving the outputs of the first and second exclusive ORing units and each outputting one of them in response to the first selection signal.

6. The apparatus of claim 5, wherein the accumulator comprises:

a first adder and a second adder for adding the respective outputs of the first and second multiplexers to values selected depending on the second selection signal and fed back thereto;

a first demultiplexer connected to the first adder and having one input terminal and two output terminals, the first demultiplexer outputting a value received from the first adder to one of the two output terminals in response to the second selection signal;

a second demultiplexer connected to the second adder and having one input terminal and two output terminals, the second demultiplexer outputting a value received from the second adder to one of the two output terminals in response to the second selection signal;

a plurality of latch means connected to the output terminals, respectively, of the first and second demultiplexers, the plurality of latch means latching values, respectively, output from the first and second demultiplexers; and third and fourth demultiplexers for selectively feeding values latched by the plurality of latch means back to the first and second adders depending on the second selection signal.

7. The apparatus of claim 6, wherein the symbol output unit is arithmetic means for performing the following operation:

$$\begin{bmatrix} x_i \\ x_q \\ y_i \\ y_q \end{bmatrix} = \begin{bmatrix} 1 & 1 & 1 & 1 \\ -1 & -1 & 1 & 1 \\ 1 & -1 & 1 & -1 \\ -1 & 1 & 1 & -1 \end{bmatrix} \begin{bmatrix} S_{iq}^1 \\ S_{iq}^2 \\ S_{qi}^1 \\ S_{qi}^2 \end{bmatrix}$$

where $S_{iq}^1$, $S_{iq}^2$, $S_{qi}^1$ and $S_{qi}^2$ are the outputs of the latch means, $x_i$ and $x_q$ are the inphase and quadrature components, respectively, of the pilot symbol, and $y_i$ and $y_q$ are the inphase and quadrature components, respectively, of the data symbol.

8. The apparatus of claim 6, wherein the second selection signal is the second code.

9. The apparatus of claim 5, wherein the second selection signal is the second code.

10. The apparatus of claim 2, wherein the second selection signal is the second code.

11. The apparatus of claim 1, wherein the second selection signal is the second code.

12. A method of despreading a code division multiple access (CDMA) signal, in which a predetermined operation on a received signal and first and second codes is performed to extract a pilot symbol and a data symbol from the received CDMA signal when the first and second codes are generated internally in a CDMA signal receiver, the method comprising:

(a) performing operations on the respective inphase and quadrature components of the received signal and the respective inphase and quadrature components of the first code;

(b) accumulatively storing the results of the operation a predetermined number of times depending on first and second selection signals which are obtained from the first and second codes; and (c) performing a predetermined operation on individual accumulated values after individual results of the operation are separately accumulated and outputting the pilot symbol and the data symbol.

13. The method of claim 12, wherein the first selection signal is the result of exclusively ORing the inphase and quadrature components of the first code, and the second selection signal is the second code.

14. The method of claim 12, wherein the predetermined number of times in (b) is the same as the number of chips constituting one symbol.

15. The method of claim 12, wherein the operation in (c) is performed according to the following equation:

$$\begin{bmatrix} x_i \\ x_q \\ y_i \\ y_q \end{bmatrix} = \begin{bmatrix} 1 & 1 & 1 & 1 \\ -1 & -1 & 1 & 1 \\ 1 & -1 & 1 & -1 \\ -1 & 1 & 1 & -1 \end{bmatrix} \begin{bmatrix} S_{iq}^1 \\ S_{iq}^2 \\ S_{qi}^1 \\ S_{qi}^2 \end{bmatrix}$$

where $S_{iq}^1$, $S_{iq}^2$, $S_{qi}^1$ and $S_{qi}^2$ are values accumulated in (b), $x_i$ and $x_q$ are the inphase and quadrature components, respectively, of the pilot symbol, and $y_i$ and $y_q$ are the inphase and quadrature components, respectively, of the data symbol.

16. A method of despreading a code division multiple access (CDMA) signal, in which a predetermined operation on a received signal and first and second codes is performed to extract a pilot symbol and a data symbol from the received CDMA signal when the first and second codes are generated internally in a CDMA signal receiver, the method comprising:

(a) grouping data of one symbol depending on the combination of the first code and second code;

(b) performing predetermined operations on the inphase component of the received signal and the inphase component of the first code with respect to the data of each group and accumulating the results of the operation during a symbol duration, and simultaneously, performing predetermined operations on the quadrature component of the received signal and the quadrature component of the first code with respect to the data of each group and accumulating the results of the operation during the symbol duration;

(c) combining the accumulated results of inphase components of one group with the accumulated results of quadrature components of the other group, the groups having the same second code, thereby obtaining a plurality of partial sums; and (d) performing a predetermined operation on partial sums to obtain the pilot symbol and the data symbol.

* * * * *